United States Patent [19]

Herron

[11] Patent Number: 4,560,181

[45] Date of Patent: Dec. 24, 1985

[54] WHEELCHAIR OPERATED BY HAND PEDALLED RECIPROCATING MOTION

[75] Inventor: Matthew A. Herron, Palo Alto, Calif.

[73] Assignee: Design Loft, Inc., Palo Alto, Calif.

[21] Appl. No.: 576,068

[22] Filed: Jan. 30, 1984

[51] Int. Cl.[4] ............................................. B62M 1/14

[52] U.S. Cl. ........................ 280/242 WC; 297/DIG. 4; 280/244

[58] Field of Search ....... 280/244, 246, 255, 242 WC; 297/DIG. 4

[56] References Cited

U.S. PATENT DOCUMENTS

| | | | |
|---|---|---|---|
| 879,947 | 2/1908 | Crecelius | 280/246 |
| 1,332,819 | 3/1920 | Eklund | 280/246 |
| 4,354,691 | 10/1982 | Saunders et al. | 280/242 WC |
| 4,358,126 | 11/1982 | Mitchell et al. | 280/242 WC |

*Primary Examiner*—Joseph F. Peters, Jr.
*Assistant Examiner*—Donn McGiehan
*Attorney, Agent, or Firm*—Townsend and Townsend

[57] ABSTRACT

A wheelchair and drive mechanism powered by reciprocating operation of a drive lever. The drive mechanism provides a continuously variable gear ratio allowing wheelchair operation at varying speeds and on differing inclines; and is readily fitted to a standard wheelchair by a drive-associated bayonet mount. A drive mechanism ratchet wheel includes an upper and lower radial crank secured for rotation thereabout by an axle. Each crank includes a pawl assembly that engages with circumferential ratchet wheel teeth to transfer drive energy supplied to the radial cranks from connecting arms to the ratchet wheel. The connecting arms are coupled to a reciprocating lever arm and operate in concert with the pawls to alternately engage with and transfer energy to the ratchet wheel, or disengage therefrom. While one connecting arm and associated pawl is transferring energy to the ratchet wheel, the other connecting arm is disengaging an associated pawl from the ratchet wheel. Energy is transferred during both a forward and rearward stroke of the lever arm to effect efficient wheelchair and drive operation.

19 Claims, 19 Drawing Figures

WHEELCHAIR OPERATED BY HAND PEDALLED RECIPROCATING MOTION

BACKGROUND OF THE INVENTION

1. Field of the Invention

The present invention relates to wheelchairs. More particularly, the present invention relates to a wheelchair powered by reciprocal hand operation of two lever arms.

2. Description of the Prior Art

An excellent discussion of the development of wheelchair art relating to the use of a reciprocal hand crank is provided in U.S. Pat. No. 3,994,509, issued 30 Nov. 1976 to Schaeffer. The portion of Schaeffer '509 above mentioned is herein incorporated by reference.

Schaeffer '509 provides a clutch and chain drive arrangement including several moving parts. Such device is not readily retrofitted to a standard wheelchair having a conventional hand rim drive but, rather, is incorporated into a special wheelchair frame at the time the wheelchair is manufactured. The device is of little use for handicapped persons of limited means who cannot afford to replace a presently used wheelchair with an entirely new wheelchair, but who would benefit from a more efficient drive mechanism.

SUMMARY OF THE INVENTION

The present invention is a wheelchair including a wheelchair drive mechanism powered by reciprocating operation of a drive lever. The drive mechanism is readily fitted to a standard wheelchair (or other vehicle) wheel and provides a continuously variable gear ratio to enable the wheelchair to be operated at various speeds and on differing inclines. One or two such drives may be provided; each drive a control for a wheel-mounted brake mechanism. Thus, all wheelchair functions, including steering, braking, and accelerating, may be accomplished without use of the hand rims.

The drive is bayonet mounted to a spoked wheelchair wheel, coaxial with the wheel's hub. As such, the drive may be removed from the wheelchair and the wheelchair operated as a standard wheelchair.

A drive ratchet wheel includes an upper and a lower radial crank secured to pivot thereabout by an axle. Each radial crank includes a pawl for engagement with circumferential ratchet wheel teeth. A corresponding upper or lower connecting arm is coupled by a pivot and linear crank to each of the radial cranks. The connecting arms are coupled, in turn, to a reciprocating lever arm.

Reciprocal motion of the lever arm by a user provides a substantially reciprocal linear motion of the connecting arms. The radial crank and pawls are arranged so that the lower radial crank pawl is engaged with the ratchet wheel teeth when the connecting arms are moving in one direction and the upper radial crank pawl is engaged with the ratchet wheel teeth when the connecting arms are moving in the opposite direction. In this way, both the forward and backward stroke of the lever arm provide direct transfer of drive power to the wheelchair wheel. A biasing and pivot mechanism is provided for each pawl to eliminate contact of the pawl with the ratchet wheel teeth during an associated radial crank return (non-driving) stroke. In this way free-wheeling is provided to allow operation of the wheelchair in either direction. For example, the hand rims may be used to back the wheelchair.

The lever arm includes a ball detent mechanism and button-actuated displacing cone by which a connecting rod pivot portion of the lever arm is incrementally or continuously moved nearer to or further away from a lever arm pivot point. Accordingly, lever arm stroke distance is adjusted to provide a variable drive gear ratio.

For example, when the connecting arm pivot point is nearer the lever arm pivot, a greater mechanical advantage is provided to the lever arm and increased torque is realized. Such a gear ratio is useful for ascending inclines.

When the connecting arm pivot point is further from the lever arm pivot point, less mechanical advantage is realized, but a higher gear ratio or greater stroke distance is provided and a correspondingly greater degree of wheel revolution is achieved per lever arm stroke. Such gear ratio is useful for achieving maximum speed on a relatively flat surface.

Any stroke length can be used to operate the drive. Thus, useful work is readily accomplished by even slight movement of the lever arm, such as is provided by an operator with limited use of his arms. Additionally, when two drives are provided, the operator may stroke the lever arms in unison or opposite from each other, without losing synchronization. Such features results from the simple mechanical arrangement of each drive. In this way, the operator's impaired coordination or lack of uniform strength in each arm, does not interfere with efficient drive operation.

DETAILED DESCRIPTION OF A PREFERRED EMBODIMENT

Figure 1:
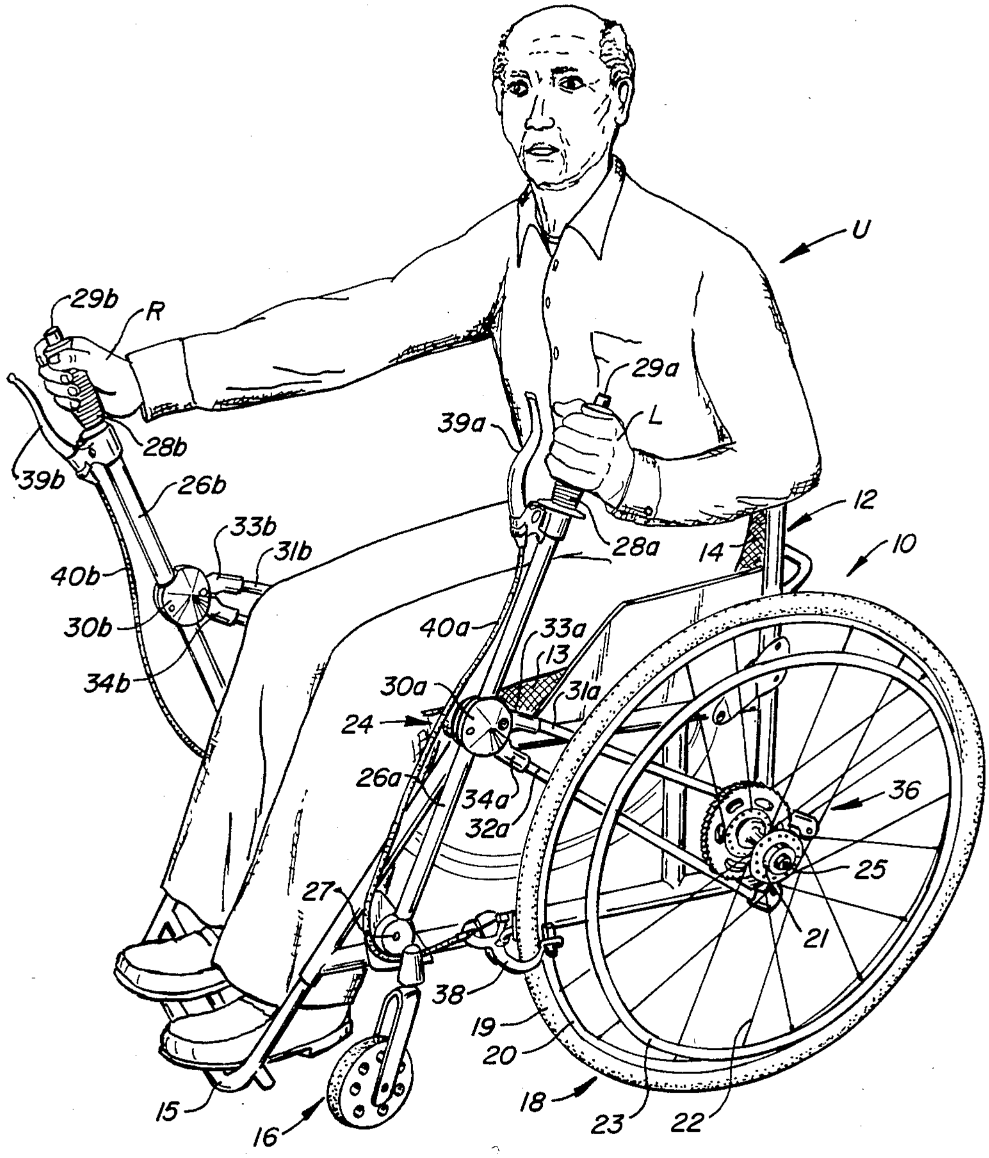
FIG. 1 is a perspective view of a wheelchair and user showing operation of a preferred embodiment of the present invention.

The present invention is a wheelchair incorporating a drive mechanism that is powered by reciprocating hand operation of a drive lever. The invention may be provided in combination with a standard wheelchair or may be provided as a drive mechanism for retrofitting to a standard wheelchair or other vehicle. A perspective view of a wheelchair 10 and user U is shown in FIG. 1.

Wheelchair 10 includes a frame 12 having a seat bottom portion 13 and seat back portion 14 that form carrying surfaces for user U. The user may rest his feet on a foot rest extension 15.

The wheelchair rides on a pair of front wheel assemblies 16 and rear wheel assemblies 18. Rear wheel assembly 18 includes a tire 19 mounted to a rim 20. The rim is rigidly connected to a hub 21 by a plurality of elongate spokes 22.

A hand drive rim 23 is shown attached to rear wheel assembly 18. In the prior art, the hand drive rim provides the most well known wheelchair drive. Such drive requires that the user grasp the hand drive rim and push downwardly on it to rotate the wheel assembly and thus effect transit of the wheelchair.

The present invention includes a reciprocating drive assembly 24 by which energy supplied through reciprocating motion of a user's right hand R and/or left hand L is translated to rotational motion at a wheel axle 25. In the preferred embodiment, the axle is not live (does not turn). A lever arm 26 is operable by reciprocal hand motion at a lever arm hand grip portion 28 for reciprocal movement about a lever arm pivot point 27. The present invention provides effective transfer of operator energy without regard to the actual length of the lever arm stroke. Thus, an operator with limited use of one or both arms may readily operate a wheelchair equipped with the present invention.

For purposes of this discussion, a base identifying number is provided for some elements of the invention as shown in FIG. 1 including an "a" designation or a "b" designation as reference to a left hand drive or a right hand drive. Although two drives are shown in FIG. 1, the present invention can be used with a single drive. The discussion herein is directed to the left hand drive although the discussion applies equally to the right hand drive, partially shown in FIG. 1. Because both drives in a dual drive wheelchair operate independently, the lever arms may be stroked either in unison, or in opposite directions without regard to synchronized operation. In this way, the operator's impaired coordination or lack of uniform strength in each arm, does not interfere with efficient drive operation.

Reciprocal motion of lever arm 26 provides relatively linear reciprocal motion of connecting rods 31 and 32 which are attached to lever arm 26 for pivotal motion about pivot points 33 and 34 by a pivot coupler 30. Connecting rods 31 and 32 are coupled to a drive 36 where the reciprocating linear motion is translated into a rotary motion of wheel assembly 18.

Spacing of connecting rods 31 and 32 from pivot point 27 is determinative of an effective gear ratio of drive mechanism 36. The spacing is readily adjusted by user operation of an adjust button 29, discussed more fully below.

The invention also provides a hand brake 39 mounted to lever arm 26. Braking energy applied to hand brake 39 is coupled through a brake cable 40 to a brake assembly 38. In this way, reliable and sure stopping of the wheelchair is provided. The brake mechanism is a particularly useful feature of the present invention because the efficiency achieved by the drive mechanism described herein enables the wheelchair to be operated at heretofore unachieved speeds, referred to as "jogging speed", considerably in excess of those otherwise achieved by prior art wheelchairs. Providing all functions, including steering, braking, and accelerating at the lever arms greatly simplifies wheelchair operation and eliminates the need to use the hand rims.

Figure 2:
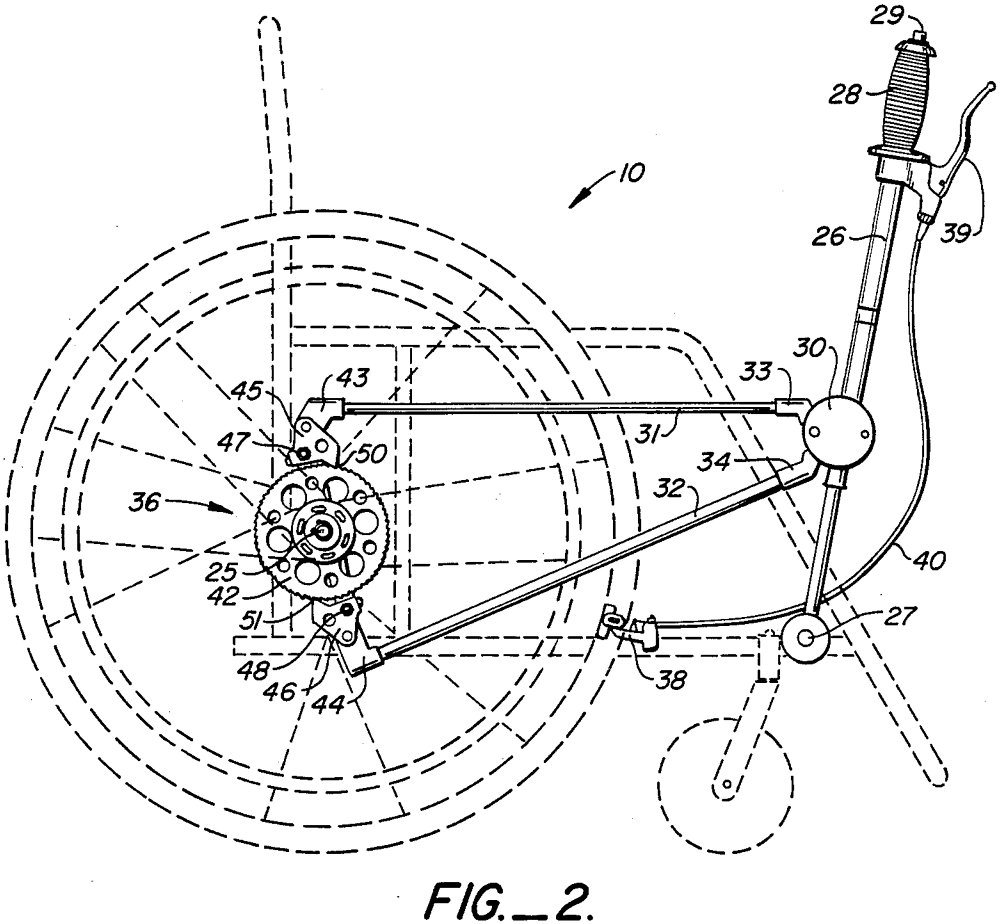
FIG. 2 is a side elevational view of the present invention.

A side elevational view of the drive mechanism is shown in FIG. 2; wheelchair 10 is shown in phantom in FIG. 2. Lever arm 26 is coupled to wheelchair frame 12 at pivot point 27. An upper linear crank 43 is coupled to an end of upper connecting rod 31 and operates an upper pawl assembly 45 about a pawl pivot point 47. Pawl operation translates the relatively linear motion of connecting rod 31 to a rotary motion by ratchet engagement of a pawl 51 with teeth 49 located about the circumference of a ratchet wheel 42. Lower connecting rod 32 also includes a linear crank 44 for operating a lower pawl assembly 46 about a pawl pivot point 48.

Figure 3A:
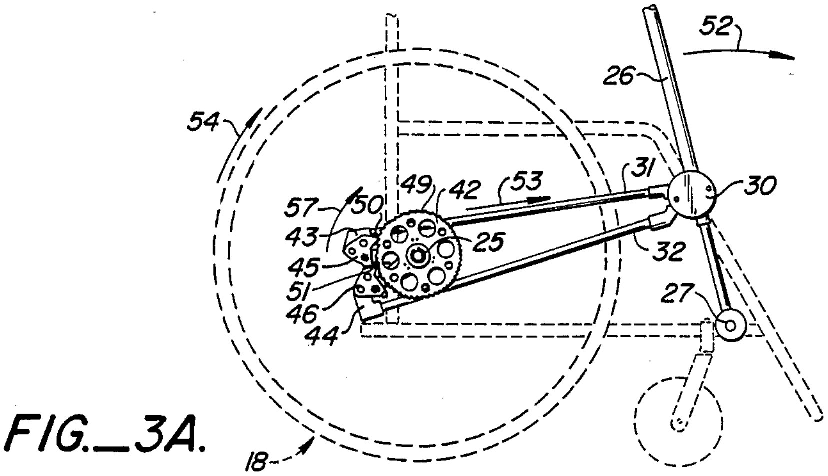
FIGS. 3*a*–3*f* provide a side view in schematic form showing operation of the present invention during an inward and outward drive stroke.

Operation of the present invention is more clearly understood by referring to FIGS. 3*a*–3*f* which provide a side view in schematic form of the present invention during a forward and a rearward stroke of lever arm 26. FIG. 3*a* shows an initial forward stroke as indicated by arrow 52. Pushing lever arm 26 in a forward direction also pulls upper and lower connecting rods 31 and 32 forward as shown by arrows 53. As a result, forward motion of connecting rod 31 is transferred through linear crank 43 to pawl assembly 45, forcing pawl 50 into ratchet wheel teeth 49. In this way, forward linear motion, as indicated by arrow 52, is translated to rotational motion of wheel assembly 18, as indicated by arrow 54. During the forward stroke, lower connecting rod 32 also transfers energy through linear crank 44 to pawl assembly 46. However, pawl 51 is arranged to disengage from ratchet wheel teeth 49 during the forward connecting rod stroke.

Figure 3B:
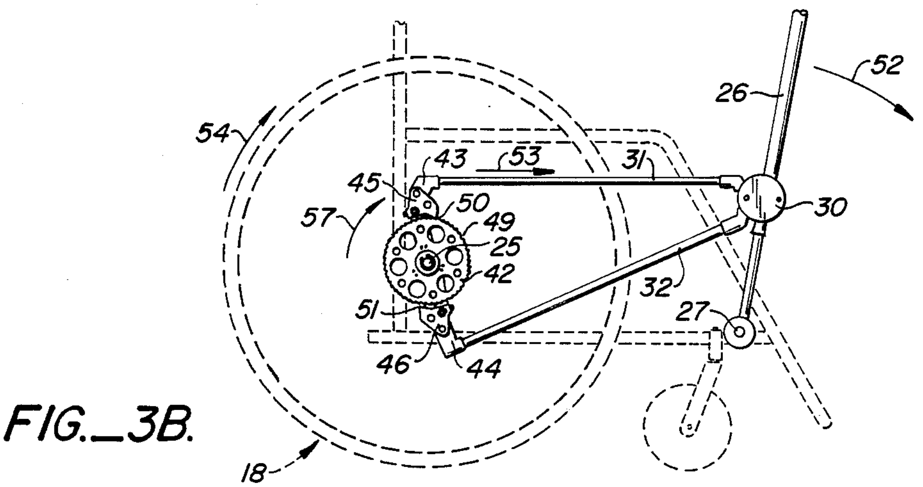
Figure 3C:
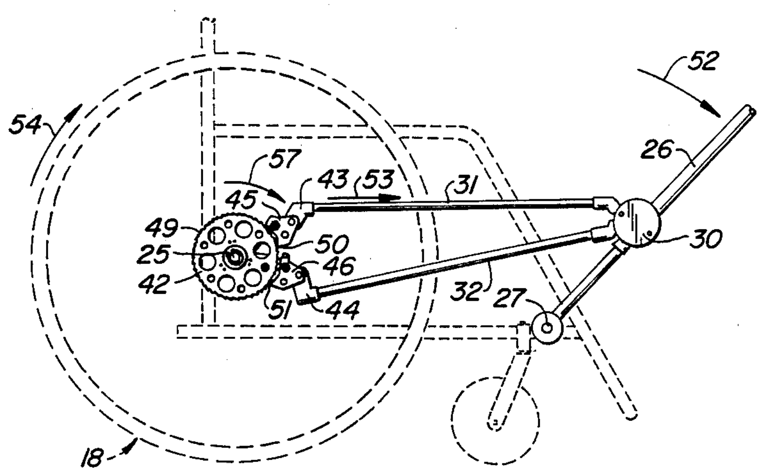

FIG. 3*b* shows the continued forward travel of lever arm 26, as indicated by arrow 52. The forward stroke is complete, as shown in FIG. 3*c*, when the maximum forward travel of lever arm 26 has been realized or when the pawl assemblies meet, described below.

Figure 3D:
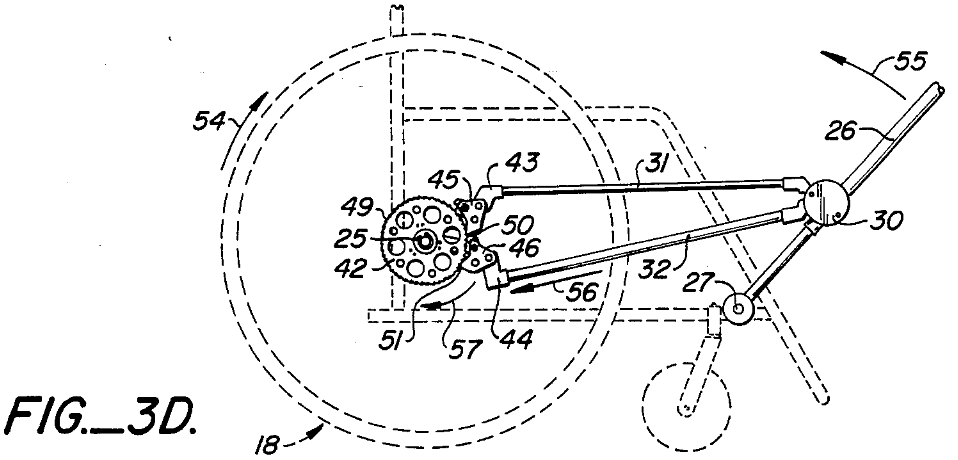
Figure 3E:
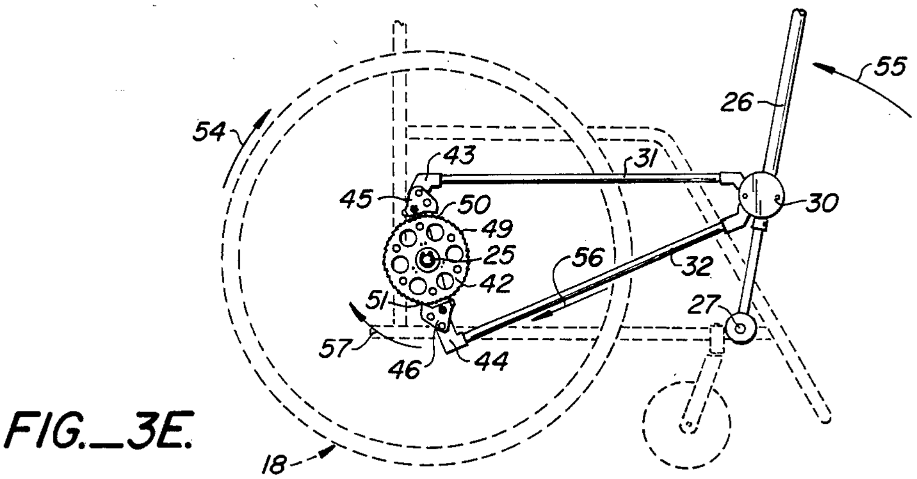
Figure 3F:
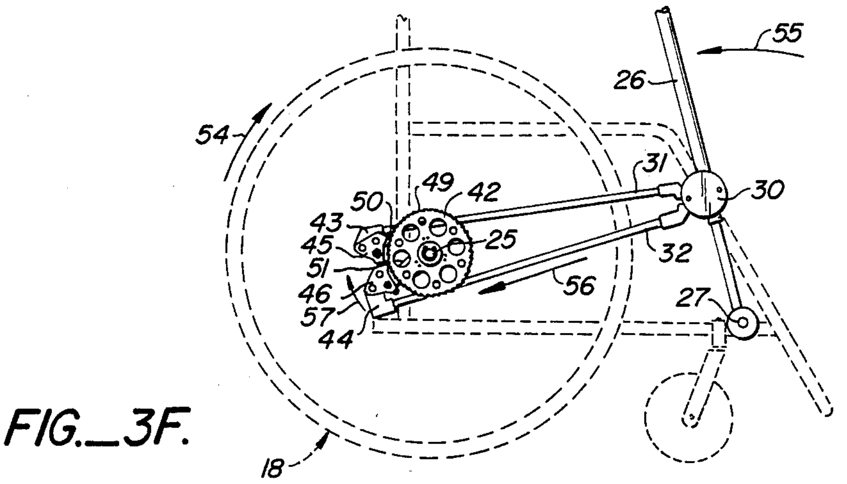

A rearward stroke is shown in FIG. 3*d*, wherein lever arm 26 is moved in the direction indicated by arrow 55. The rearward movement pushes connecting rods 31 and 32 in the direction indicated by arrow 56. During the rearward stroke, pawl 50 is disengaged from ratchet wheel teeth 49 and pawl 51 is engaged within the teeth. The rearward stroke transfers energy through connecting rod 32 and pawl 51 to ratchet wheel 42 to rotate wheel assembly 18 in the direction indicated by arrow 54. During the rearward stroke, pawl 50 is disengaged from ratchet wheel teeth 49 and does not interfere with the transfer of energy from the lever arm to the ratchet wheel. Completion of the rearward stroke is shown in FIG. 3*f*. Thereafter, the cycle repeats as shown in FIG. 3*a*.

In summary, a forward stroke transfers energy to the ratchet wheel by engagement of an upper pawl with ratchet wheel teeth. During the forward stroke, the lower pawl is disengaged therefrom and does not interfere with the transfer of energy to the ratchet wheel. A rearward stroke transfers energy to the ratchet wheel by engagement of a lower pawl with the ratchet wheel teeth. During the rearward stroke, the upper pawl is disengaged therefrom and does not interfere with the transfer of energy to the ratchet wheel. Accordingly, there is efficient energy transfer in both a forward and a rearward stroke of lever arm 26.

Taking FIGS. 3*a*–3*f* as a series, it can be seen that a forward and rearward stroke (reciprocating motion) of lever arm 26 operates ratchet wheel 42 according to a sine wave function. For example, FIG. 3*a* is the initial move from a resting point upwardly along a sine curve. At this point, operation of the drive is less efficient and requires greater torque from a user to provide acceleration of wheel assembly 18. Such performance characteristics of the invention correspond to the known performance characteristics of the human arms, shoulders, and torso when effecting outward and inward reciprocal motion, as when performing a bench press, or while rowing. That is, when initially moving outwardly, the human arm is quite strong because the force exerted is that which is exerted by the shoulders and torso. During initial movement, the arm contributes very little to the great amount of force supplied by the body.

The main advantage of sinusoidal motion of lever 26 is to provide smooth acceleration and deceleration of the body and arms and the lever arm and other reciprocating elements at the beginning of a forward or rearward stroke. That is, the mechanism and operator need not be up to speed before useful power can be extracted, for example at the beginning of each stroke (forward or backward). Also, power can still be extracted as the operator slows down to reverse stroke.

The range of shoulder and torso movement is limited. Once the extensive limit of this portion of the body is reached, the greatest amount of work is thereafter done by the arm. It is not difficult for a weight lifter to initially lift the weight to his shoulders. Thereafter, the arms alone must provide the force required to raise the weight above his head. In recognition of this human performance factor, the drive is provided having greater operating efficiency at a midtravel of lever arm 26. Referring to FIG. 3*b*, it is shown that movement of pawl 50 and connecting rod 31 is practically tangential to ratchet wheel 42. Accordingly, a smooth substantially linear transfer of energy is provided in the midrange of lever arm travel. This transfer corresponds to the flat peak of the sine wave curve.

After final extension of the arm (furthest lever arm travel), the shoulders and torso once again become a factor in the strength of the individual. This corresponds to a downward sloping portion of the sine wave curve where efficiency of the drive is once again not at a maximum.

The sine wave cycle described above is repeated for the backward stroke of lever arm 26. Accordingly, the lever arm is initially pulled backward by the cooperation of the shoulders, arm, and torso to overcome an initial inefficiency reflecting a downward sloping portion of the sine wave curve. At midrange, pawl 51 is pushed tangentially to ratchet wheel 42 by connecting rod 32 and maximum efficiency is achieved, at an operating point corresponding to the least efficient portion of the human arm travel during the rearward stroke. Thereafter, the efficiency of the drive slightly decreases. Correspondingly, the strength of the operator once again increases as a result of the torso and shoulders becoming a factor in the overall body strength.

Thus, the invention exploits to good advantage the natural weaknesses and strengths of the human arms, shoulders, and torso to achieve maximum efficiency from the drive in relation to driving force produced by the operator. Accordingly, the device operating load is evenly matched to the output of the operator through all portions of the forward and rearward stroke, modeled after a function that varies from almost linear in "low" gear to almost sinusoidal in high gear. The sinusoidal nature of the mechanism is derived mostly from the angle of the radial arms.

Figure 4A:
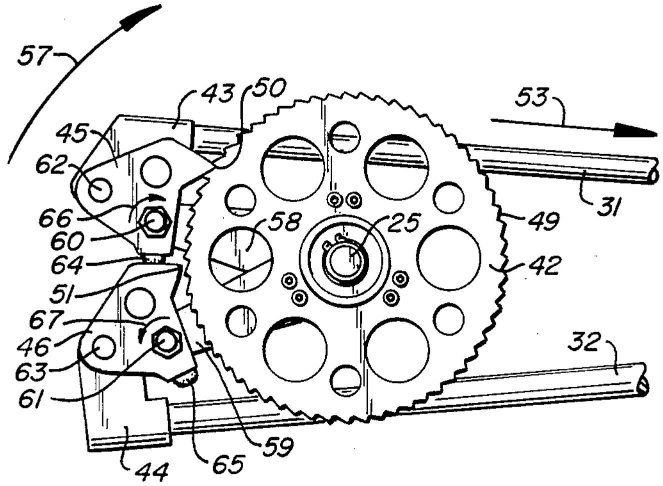
FIGS. 4*a*–4*f* provide in greater detail a side view in schematic form showing operation of the present invention during an inward and outward drive stroke.
Figure 4B:
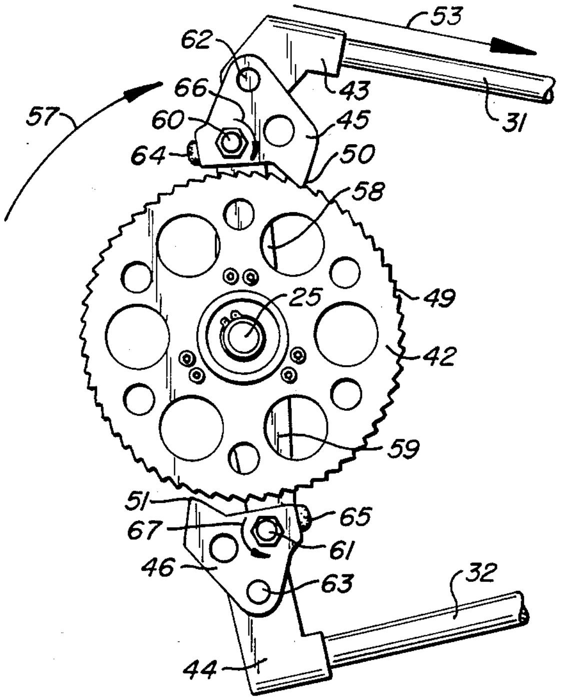
Figure 4C:
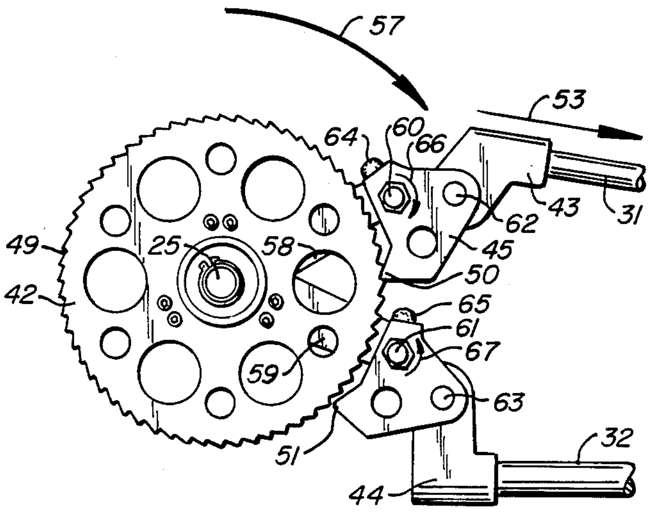

A side view in schematic form showing operation of the present invention in greater detail during a forward and rearward drive stroke is provided in sequence in FIGS. 4*a*–4*f*. In particular, FIGS. 4*a*–4*f* show operation of pawls 50 and 51 during engagement and disengagement. In FIG. 4*a*, connecting rod 31 is receiving a forward force, indicated by arrow 53. This force is transferred through linear crank 43 about a pivot 62 to pawl assembly 45. Pawl assembly 45 is pivotally arranged about a pivot point 60 for cooperating motion about ratchet wheel 42 as controlled by an upper radial crank 58. Radial crank 58 is arranged for pivotal motion about axle 25 and is provided to maintain pawl 45 in proper alignment with ratchet wheel 42 and also to provide a fixed point about which pawl 50 may pivot into and out of engagement with ratchet wheel teeth 49. Pawl assembly 45 is pivoted about pivot point 60, as shown by arrow 66, to engage pawl 50 with ratchet wheel teeth 49.

A similar action disengages pawl 51 from engagement with ratchet wheel teeth 49 during the forward stroke. Forward motion of connecting rod 32 is transferred by linear crank 44 into pivotal motion of pawl assembly 46 about pivot point 63. This pivotal motion produces a corresponding pivotal motion about pivot point 61, as shown by arrow 67, at the point where pawl assembly 46 engages with radial crank 59. Radial crank 59 serves a similar function for pawl assembly 46 as radial crank 58 serves for pawl assembly 45.

Pivotal motion about pivot point 61 pulls pawl 51 outwardly from ratchet wheel teeth 49 during the forward stroke. Pawl 50 remains engaged and pawl 51 remains disengaged from ratchet wheel teeth 49 during the entire forward stroke sequence (see, in particular, FIGS. 4*b* and 4*c*) as long as a forward force is transferred through connecting rods 31 and 32. Should force be removed from the connecting rods—for example, should the user cease to stroke the lever arm—then both pawls 50 and 51 are disengaged from ratchet wheel teeth 49 and the drive assembly freewheels. Such operation is particularly useful during a coasting sequence, for example, down an incline or to dissipate excess speed without applying braking energy. Freewheeling also eliminates noise, and allows backing up by use of the hand rims.

When the end of a stroke is reached, as is shown in FIGS. 4*a*, 4*c*, 4*d*, and 4*f*, excessive movement past top dead center by a pawl is prevented by abutting engagement of one pawl assembly with the other at a bump stop position. Accordingly, pawl assembly 45 includes a bump stop 64 and pawl assembly 46 includes a bump stop 65. At one extreme of pawl assembly movement (FIGS. 4*f*), bump stop 64 serves to limit rotational motion of the pawl assemblies and their associated radial cranks about the circumference of ratchet wheel 42. At the other extreme of pawl assembly movement (FIGS. 4*c* and 4*d*), bump stop 65 serves to limit rotational motion of the pawl assemblies and their associated radial cranks about the circumference of ratchet wheel 42.

Figure 4D:
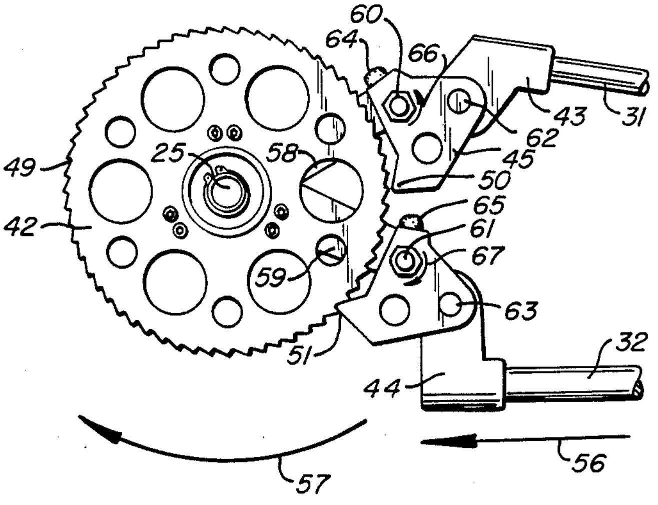
Figure 4E:
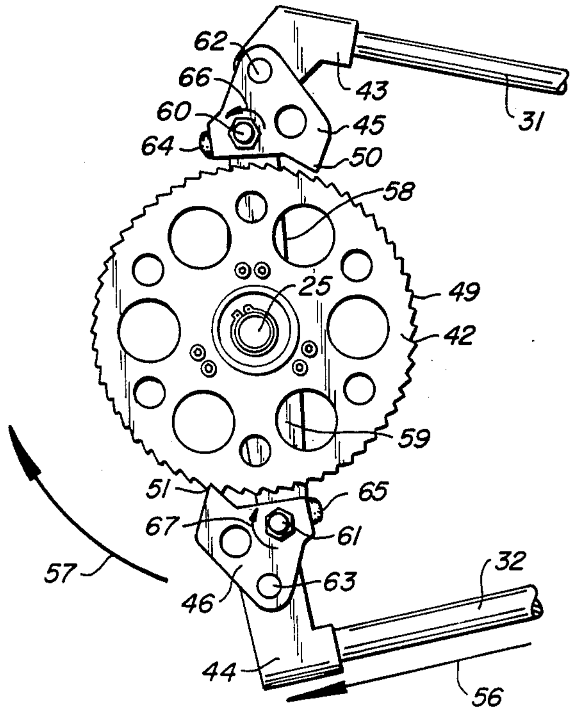
Figure 4F:
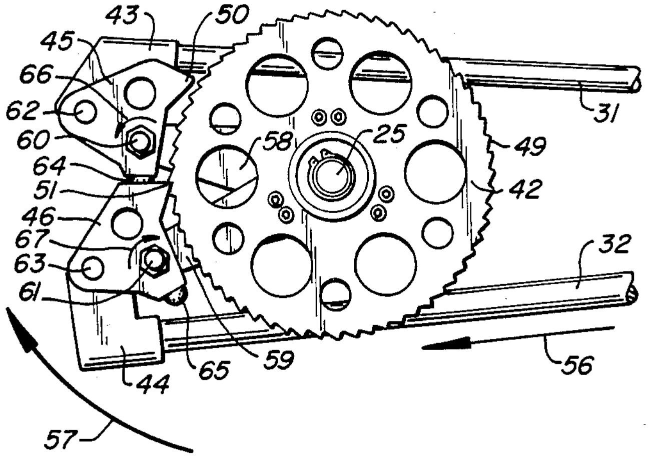

In FIGS. 4*d*–4*f*, a rearward stroke is shown during which connecting rod 31 transmits energy through linear crank 43 about pivot point 62 to pivot pawl assembly 45, and to radial crank 58 about pivot point 60 in a direction indicated by arrow 66. This action disengages pawl 50 from ratchet wheel teeth 49. Thus, there is no transfer of energy through pawl 50 to ratchet wheel 42 during a backward stroke.

Conversely, rearward movement of connecting rod 32 transfers energy to linear crank 44 about pivot point 63 and thereafter to pawl assembly 46. This action causes movement of pawl assembly 46 and associated radial crank 59 about pivot point 61 in the direction indicated by arrow 67. As a result, pawl 51 is engaged with ratchet wheel teeth 49 and the rearward stroke thereby transfers energy to ratchet wheel 42.

An important feature of the present invention is the inclusion of a variable gear ratio to provide both a high-torque/slow-speed operating position for ascending inclines, and a low-torque/high-speed operating position for travelling at high speeds on flat surfaces. Such gear ratio is a function of the distance of pivot coupler 30 from pivot point 27, which correspondingly adjusts the length of throw of connecting rods 31 and 32 in relation to the movement of lever arm 26.

Figure 5A:
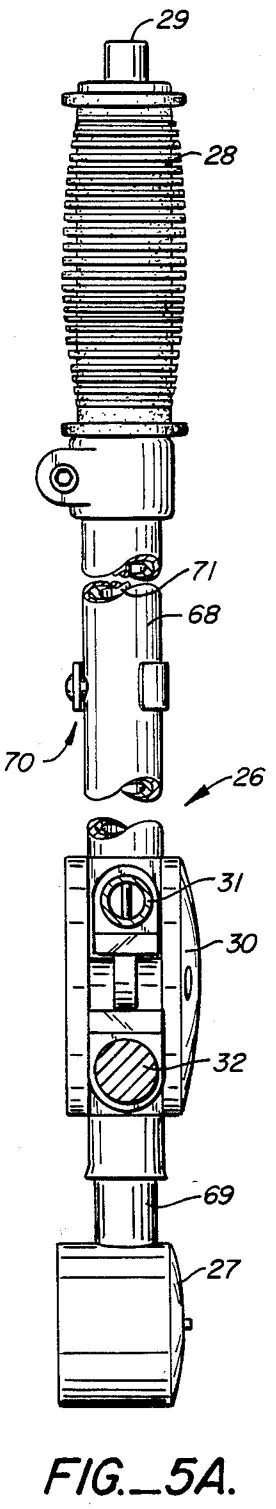
FIGS. 5*a*–5*c* provide a side elevational and cross sectional views of the lever arm portion of the present invention showing operation thereof to effect a change in gear ratio.
Figure 5B:
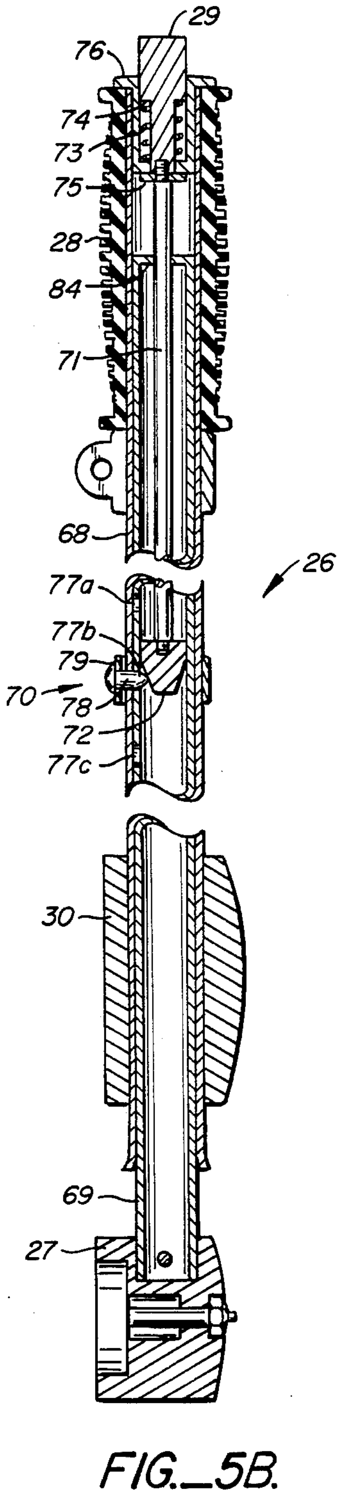
Figure 5C:
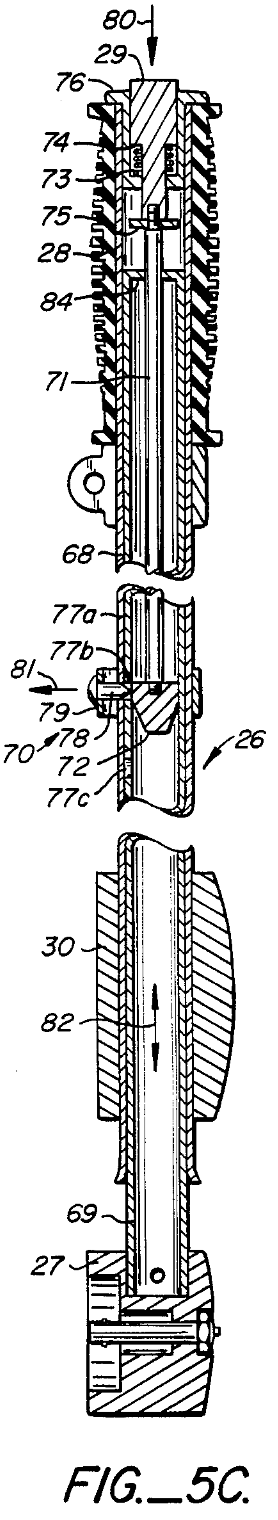

A side elevational and cross sectional view of lever arm 26 is shown in FIGS. 5a–5c. FIG. 5a shows adjustment button 29, handle grip 28, an upper shaft portion 68, a lower shaft portion 69, and a detent mechanism 70. Pivot coupler 30 is attached to a lower portion of upper shaft 68; lower shaft 69 telescopes into upper shaft 68 and includes a terminating portion that is coupled to pivot point 27.

A cross sectional view of the lever arm and adjusting mechanism is shown in FIG. 5b. Button 29 includes a long shaft portion 71 that terminates in a conical tip 72. Conical tip 72 is coincidental with detent 78, which is held inwardly within aperture 77b by a spring band 79. A spring 73 is provided that presses outwardly against a shaft surface 76 and a button surface 74 to force button 29 upwardly. Button 29 is held in position by a washer 75.

Lower shaft 69 includes an upper portion 84, that is provided to prevent lower shaft 69 from becoming inadvertently separated from upper shaft 68, should a gear ratio adjustment move apertures 77a past detent 78.

The embodiment of the invention pictured in FIG. 5 includes three apertures *77a–77c* corresponding to three gear ratios. Other embodiments of the invention may be provided with fewer or more detent positions as is desired, corresponding to the gear ratio range to be provided by the drive mechanism.

Operation of the lever arm adjust mechanism is best seen in FIG. 5c where a downward depression of button 29, shown by arrow 80, compresses spring 73 and forces shaft 71 past conical tip 72 to displace detent 78 from aperture *77b*, shown by arrow 81. A conical tip portion of detent 78 allows free movement of inner shaft 69 relative to outer shaft 68 to relocate the inner shaft in position at either of apertures 77a or 77c, as desired. The location of pivot coupler 30 relative to pivot point 27 is thus changed, as shown by arrow 82.

Figure 6:
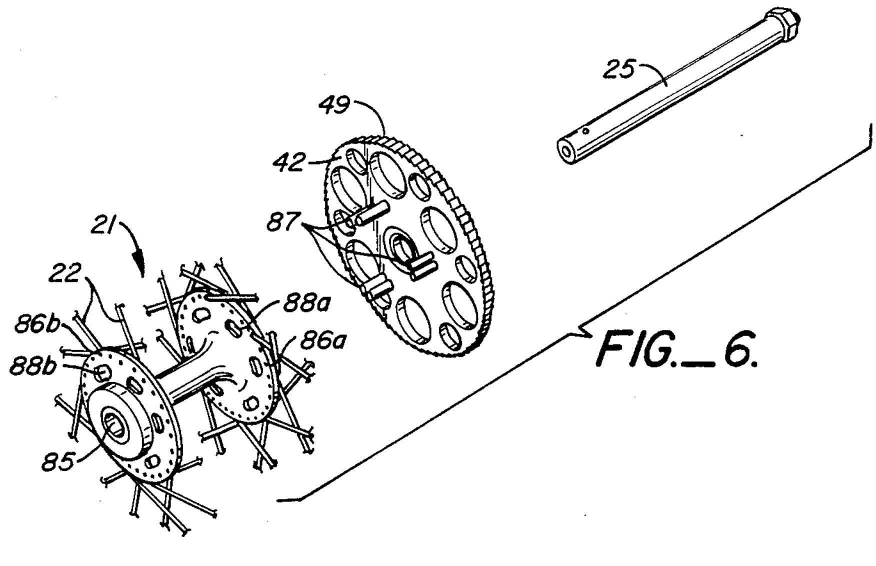
FIG. 6 is an exploded perspective view showing engagement of the drive mechanism bayonet mount with a wheel hub.

An exploded perspective view showing engagement of the drive mechanism with a wheel hub is provided by FIG. 6. Wheel hub 21 includes an axle 25 received through a bore 85; and two flanges 86a and 86b, each of which includes a plurality of slots 88a and 88b, respectively.

Ratchet wheel 42 is shown including a series of outwardly projecting pins 87. The pins engage in bayonet-like fashion within slots 88a and 88b: ratchet wheel 42 is thus positioned coaxial with axle 25. Rotational motion of ratchet wheel 42 effects a similar rotational motion of hub 21, which in turn rotates rear wheel assembly 18. The drive mechanism is readily fitted to any standard wheelchair and may be readily removed therefrom for service without removing the wheelchair from service. Any existing standard wheelchair may readily include the present invention to provide heretofore unavailable efficiency and ease of operation for the wheelchair-ridden user.

Figure 7:
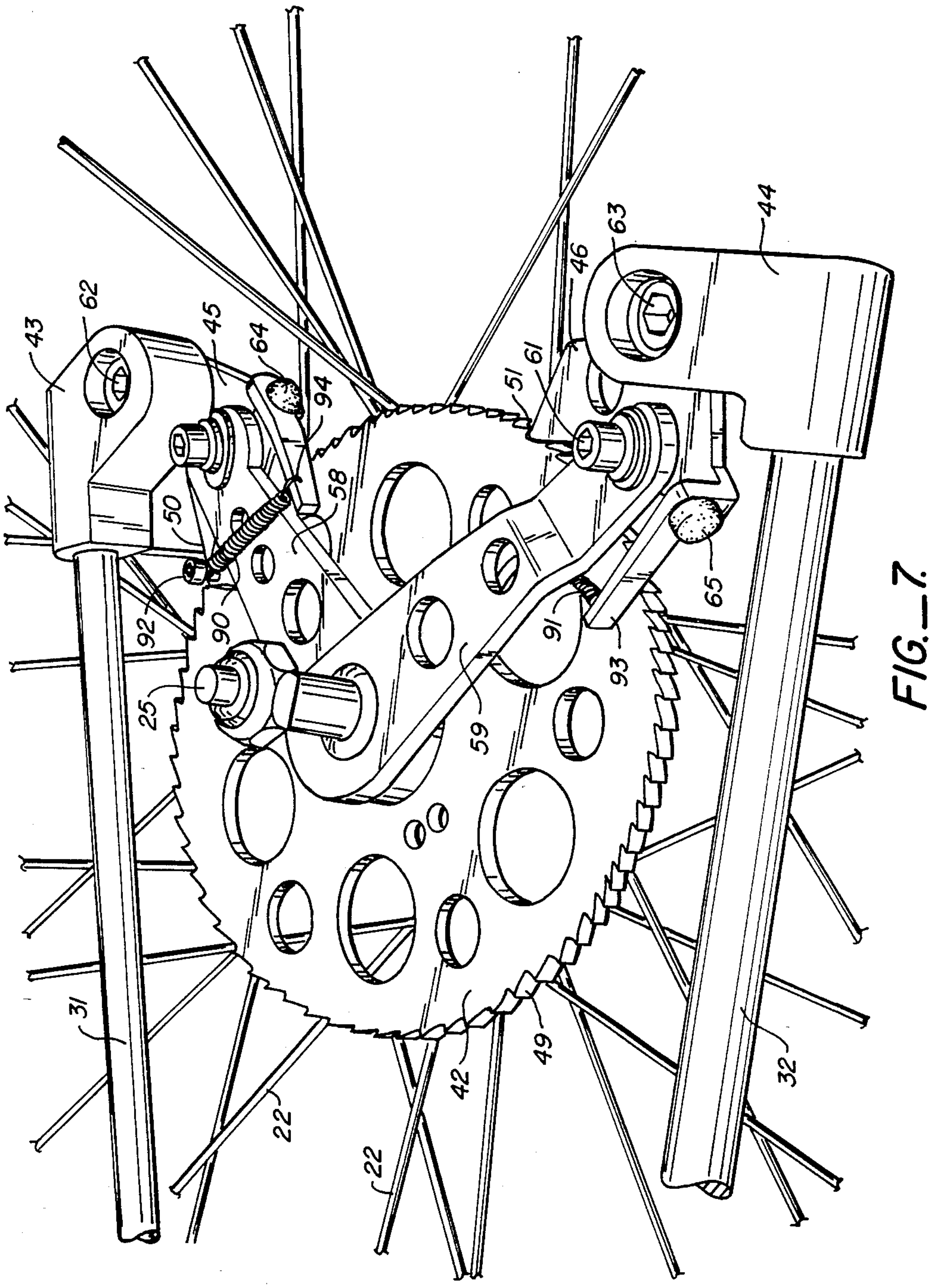
FIG. 7 is a perspective view of the preferred embodiment of the drive mechanism.

A perspective view of the drive mechanism showing radial cranks 58 and 59 more clearly is provided in FIG. 7. Energy driving ratchet wheel 42 also engages or disengages pawl assembly 46 with ratchet wheel 42. Freewheeling ability of the drive is enhanced, and objectionable noise and deteriorating wear to the pawl and ratchet wheel assembly are eliminated by adding a bias to the pawls to counteract the effect of gravity on a disengaged pawl during a return stroke. Springs 90 and 91 are included with the upper and lower pawl assemblies—spring 91 is shown in partial view including a pawl assembly attachment point 93. When a driving force is not applied to pawl assembly 46 through connecting rods 32, spring 91 biases pawl 51 outwardly from ratchet wheel teeth 49.

Spring 90 is shown coupled between a pawl spring attachment point 94 and a radial crank spring attachment point 92. When a driving force is not applied to pawl assembly 45, the pawl is prevented from dragging across the ratchet under teeth during a return stroke or while freewheeling. Wear and tear, and disagreeable noise are thus eliminated.

The present invention provides a wheelchair and drive mechanism readily fitted thereto, including a continuously variable gear ratio to enable the wheelchair to be operated at various speeds and on differing inclines at maximum efficiency. One or two drives may be attached to a wheelchair. A brake mechanism may be included if desired. Because the drive mechanism is bayonet-mounted to a spoked wheelchair wheel coaxial with the wheel's hub, the drive may be attached to any standard wheelchair with quick release axles and the right hubs.

The ratchet wheel and pawl mechanism provide efficient transfer of energy with a minimum amount of moving parts. Thus, a simple, inexpensive, and serviceable mechanism is provided having high reliability and operability without the need for frequent or complicated repair. The drive pawls and connecting rods are arranged relative to the ratchet wheel to exploit the performance dynamics of the human body during a sine-wave-like stroke sequence. Maximum transfer of energy from the user to the drive mechanism is achieved in accordance with a user's energy output during a stroke sequence.

I claim:

1. A wheel chair, comprising, a chair frame;

at least one lesser diameter wheel mounted to said frame at a front base portion thereof;

two larger diameter drive wheels mounted to said frame at a rear base portion thereof; and at least one drive mechanism fastened to one of said drive wheels for direct transfer of drive energy thereto, said drive mechanism including;

(a) a lever arm having a first end portion thereof fastened to said frame for reciprocal pivotal movement about a first pivot point at a front base portion thereof, and having a second end portion including a hand grip to allow operator effected reciprocal pivotal movement about said first pivot point;

(b) at least one connecting rod, said rod having a first end portion thereof fastened to said lever arm for pivotal movement about a second pivot point at a lever arm midportion, and having a second end portion;

(c) at least one pawl fastened to each connecting rod for pivotal movement about a third pivot point at said second connecting rod end portion;

(d) at least one radial crank having a first end portion thereof fastened to an associated pawl for pivotal movement about a fourth pivot point, said fourth pivot point being noncoincident with said third pivot point, and having a second end portion thereof fastened for pivotal movement about a central pivot point coaxial with a drive wheel axle; and (e) a ratchet wheel having a center portion fastened for rotational movement about said central pivot point, and having a plurality of circumferential teeth for engagement with said pawl;

whereby lever arm operation in one direction engages said pawl with said ratchet wheel teeth for translation of reciprocal lever arm movement to rotational ratchet wheel movement in a drive direction.

2. The wheelchair of claim 1, further comprising:

at least one brake means associated with one of said drive wheels for selectably stopping wheel movement.

3. The wheelchair of claim 1, said lever arm including:

means for adjusting connecting rod spacing at said second pivot point from said first pivot point to selectably vary resulting connecting rod movement, whereby a continuously variable drive mechanism gear ratio is provided.

4. The wheelchair of claim 1, further comprising:

bayonet mount means for removably fastening said drive mechanism to one of said drive wheels.

5. The wheelchair of claim 1 and including two connecting rods, two pawls and two radial cranks, whereby lever arm operation in the first direction engages the first pawl with said ratchet wheel teeth for translation of reciprocal lever arm movement to rotational ratchet wheel movement in a drive direction engages the second pawl with said ratchet wheel teeth, and disengages said first pawl therefrom, for translation of reciprocal lever arm movement to rotational ratchet wheel movement in said drive direction.

6. In a wheelchair including a chair frame, at least one lesser diameter wheel mounted to said frame at a front base portion thereof, and two larger diameter drive wheels mounted to said frame at a rear base portion thereof, a wheelchair drive mechanism, comprising:

a lever arm having a first end portion thereof adapted to be fastened to said frame for reciprocal pivotal movement about a first pivot point at a front base portion thereof, and having a second end portion including a hand grip to allow operator effected reciprocal pivotal movement about said first pivot point;

at least one connecting rod, said rod having a first end portion thereof fastened to said lever arm for pivotal movement about a second pivot point at a lever arm midportion, and having a second end portion;

at least one pawl fastened to each connecting rod for pivotal movement about a third pivot point at said second connecting rod end portion;

at least one radial crank having a first end portion thereof fastened to each pawl for pivotal movement about a fourth pivot point, said fourth pivot point being noncoincident with said third pivot point, and having a second end portion thereof fastened for pivotal movement about a central pivot point coaxial with a drive wheel axle;

a ratchet wheel having a center portion fastened to one of said drive wheels for direct transfer of drive energy thereto by rotational movement of said ratchet wheel above said central pivot point, said ratchet wheel having a plurality of circumferential teeth for engagement with said pawl;

whereby lever arm operation in one direction engages said pawl with said ratchet wheel teeth for translation of reciprocal lever arm movement to rotational ratchet wheel movement in a drive direction.

7. The drive of claim 6, further comprising:

at least one brake means associated with one of said drive wheels and operable by manipulation of a hand control fastened to said lever arm, to provide selectable stopping of wheel movement.

8. The wheelchair of claim 5, said lever arm including:

means for adjusting connecting rod spacing at said second pivot point from said first pivot point to selectively vary resulting connecting rod movement, whereby a continuously variable drive mechanism gear ratio is provided.

9. The drive of claim 6, further comprising:

bayonet mount means adapted for removably fastening said drive mechanism to one of said drive wheels.

10. The wheelchair drive mechanism of claim 6 and including two connecting rods, two pawls, and two radial cranks, whereby lever arm operation in a first direction engages the first pawl with said ratchet teeth for translation of reciprocal lever arm movement to rotational ratchet wheel movement in a drive direction, and whereby lever arm operation in the second, opposite direction engages the second pawl with said ratchet wheel teeth, and disengages said first pawl therefrom, for translation of reciprocal lever arm movement to rotational ratchet wheel movement in said drive direction.

11. A drive mechanism adapted to be fastened to a vehicle drive wheel for direct transfer of drive energy thereto, comprising:

a lever arm having a first end portion thereof fastened to a vehicle frame for reciprocal pivotal movement about a first point at a front base portion there of, and having a second end portion including a hand grip to allow operator effected reciprocal pivotal movement about said first pivot point;

at least one connecting rod, said rod having a first end portion thereof fastened to said lever arm for pivotal movement about a second pivot point at a lever arm midportion, and having a second end portion;

at least one pawl fastened to each connecting rod, for pivotal movement about a third pivot point at said connecting rod second end portion;

at least one radial crank having a first end portion thereof fastened to said pawl, for pivotal movement about a fourth pivot point, said fourth pivot point being noncoincident with said third pivot point, and having a second end portion thereof fastened for pivotal movement about a central point coaxial with a drive wheel axle; and a ratchet wheel having a center portion fastened for rotational movement about said central pivot point, and having a plurality of circumferential teeth for alternate engagement with said first and second pawls;

whereby lever arm operation in one direction engages said pawl with said ratchet wheel teeth for translation of reciprocal lever arm movement to rotational ratchet wheel movement in a drive direction.

12. The drive of claim 11, said lever arm including:

means for adjusting connecting rod spacing at said second pivot point from said first pivot point to selectably vary resulting connecting rod movement corresponding to reciprocal lever arm movement, whereby a continuously varying drive mechanism gear ratio is provided.

13. The drive of claim 12, said lever arm including a first portion to which said connecting rods are pivotally secured and a telescoping second portion having an end portion secured to said first pivot point, said means for adjusting including:

an actuating rod positioned within a hollow inner portion of said lever arm at said hand grip portion thereof and including an actuator portion extending outwardly past said first lever arm end portion coaxial therewith and including a conical tip portion;

biasing means for maintaining said actuator portion in said extended position;

detent means coincident with said conical tip for securing said first lever arm portion to said telescoping second lever arm portion; and biasing means for maintaining said detent means within abutment of said actuating rod conical tip portion;

whereby depression of said actuating rod within said lever arm forces said actuating rod tip portion to displace said detent to thereby allow free telescoping motion of said second lever arm portion relative to said first lever arm portion, such that said connecting rods associated with said first lever arm portion are accordingly moved nearer to or farther from said lever arm pivot point associated with said telescoping second lever arm portion.

14. The drive of claim 11, further comprising:

bayonet mount means adapted for removably fastening said drive mechanism to said drive wheel.

15. The drive of claim 11, said pawls each further comprising:

biasing means, for withdrawing said pawl from engagement with said ratchet wheel teeth in the absence of a countering drive force supplied by an associated one of said connecting rods.

16. The drive of claim 11, said pawls being operable to alternately engage with said ratchet wheel teeth when said associated connecting rods are operated in substantially opposite directions, said first pawl being engaged in a first connecting rod direction, said second pawl being engaged in an opposite connecting rod direction, thereby providing for transfer of drive energy to said ratchet wheel during both forward and a rearward reciprocating lever arm stroke.

17. The drive of claim 16, said pawls being biased by connecting rods to engage with said ratchet wheel teeth when pivoted in an engagement direction.

18. The drive of claim 11, each pawl being operable between a first extreme position and a second extreme position, corresponding to extremes of lever arm movement, each pawl including a bump stop to damp abutment of one pawl with the other as well as disengage the pawls at each extreme of pawl movement.

19. The drive mechanism of claim 11 and including two connecting rods, two pawls, and two radial cranks, whereby lever arm operation in the first direction engages the first pawl with said ratchet wheel teeth for translation of reciprocal lever arm movement to rotational ratchet wheel movement in a drive direction, and whereby lever arm operation in the second, opposite direction engages the second pawl with said ratchet wheel teeth, and disengages said first pawl therefrom, for translation of reciprocal lever arm movement to rotational ratchet wheel movement in said drive direction.

* * * * *